(12) United States Patent
Wong

(10) Patent No.: US 7,830,984 B2
(45) Date of Patent: Nov. 9, 2010

(54) OFDM/OFDMA CHANNEL ESTIMATION

(75) Inventor: Cheong Yui Wong, Tai Po (HK)

(73) Assignee: Hong Kong Applied Science and Technology Research Institute Co., Ltd., Hong Kong (CN)

( * ) Notice: Subject to any disclaimer, the term of this patent is extended or adjusted under 35 U.S.C. 154(b) by 760 days.

(21) Appl. No.: 11/694,616

(22) Filed: Mar. 30, 2007

(65) Prior Publication Data

US 2008/0240262 A1  Oct. 2, 2008

(51) Int. Cl.
*H04L 27/06* (2006.01)
(52) U.S. Cl. ........................... 375/316; 375/340
(58) Field of Classification Search ................. 375/260, 375/340, 362, 366, 316, 347; 370/503, 505, 370/509–514, 525, 208, 210, 319, 344
See application file for complete search history.

(56) References Cited

U.S. PATENT DOCUMENTS

| | | | | |
|---|---|---|---|---|
| 7,116,632 B2 * | 10/2006 | Alapuranen | ................. | 370/208 |
| 7,161,972 B2 | 1/2007 | Huh et al. | | |
| 7,308,063 B2 * | 12/2007 | Priotti | ........................ | 375/362 |
| 7,352,829 B2 * | 4/2008 | Jalloul et al. | ................ | 375/340 |
| 7,397,869 B2 * | 7/2008 | Ginesi et al. | ................ | 375/326 |
| 7,515,641 B2 | 4/2009 | Yu et al. | | |
| 7,564,775 B2 * | 7/2009 | Jayaraman et al. | .......... | 370/208 |
| 2004/0234013 A1 | 11/2004 | Li et al. | | |
| 2005/0135230 A1 | 6/2005 | Yu et al. | | |
| 2005/0135509 A1 | 6/2005 | Mantravadi et al. | | |
| 2005/0141474 A1 | 6/2005 | Lee et al. | | |
| 2005/0276364 A1 * | 12/2005 | Black et al. | ................. | 375/354 |
| 2006/0018393 A1 * | 1/2006 | Gore et al. | ................... | 375/260 |
| 2006/0098749 A1 | 5/2006 | Sung et al. | | |
| 2006/0227812 A1 * | 10/2006 | Vrcelj et al. | ................ | 370/503 |
| 2007/0177684 A1 * | 8/2007 | Halbauer et al. | ............ | 375/260 |
| 2007/0189404 A1 * | 8/2007 | Baum et al. | ................. | 375/260 |
| 2007/0211806 A1 * | 9/2007 | Mudulodu et al. | ......... | 375/260 |
| 2007/0211809 A1 | 9/2007 | Kim | | |
| 2007/0281654 A1 | 12/2007 | Choi | | |
| 2008/0118009 A1 * | 5/2008 | Chuang et al. | .............. | 375/340 |
| 2008/0130766 A1 | 6/2008 | Li et al. | | |

OTHER PUBLICATIONS

Doo Hwan Lee et al., "Analysis of Ranging Process in IEEE 802.16e Wireless Access Systems," pp. 172-179.

* cited by examiner

*Primary Examiner*—Tesfaldet Bocure
*Assistant Examiner*—Lawrence B Williams
(74) *Attorney, Agent, or Firm*—Fulbright & Jaworski L.L.P.

(57) ABSTRACT

Systems and methods which introduce a variable shift with respect to pilot symbols in providing a data subcarrier channel estimation are shown. Use of pilot symbol shifts may be useful, for example, when path delay is long and/or when non-consecutive, non-uniformly distributed pilot subcarriers are used. The foregoing shift may be introduced in the time or frequency domains according to embodiments of the invention. For example, a shift of a particular number of samples may be introduced with respect to the symbols of the pilot subcarriers in the measured pilot subcarrier channel response for use in data subcarrier channel estimation.

19 Claims, 6 Drawing Sheets

*(PRIOR ART)*

OFDM/OFDMA CHANNEL ESTIMATION

RELATED APPLICATIONS

The present application is related to co-pending and commonly assigned U.S. patent application Ser. No. 11/694,647 entitled "OFDM/OFDMA TIMING SYNCHRONIZATION USING NON-CONSECUTIVE PILOT SUBCARRIER ASSIGNMENT," filed concurrently herewith, the disclosure of which is incorporated herein by reference.

TECHNICAL FIELD

The invention relates generally to channel estimation for communications and, more particularly, to channel estimation where non-consecutive, non-uniformly distributed pilot subcarrier assignments are used.

BACKGROUND OF THE INVENTION

Channel estimation is often used to facilitate communications, such as to provide reliable decoding of data in a communication system. For example, wireless communications will often experience different channel responses in different environments and/or at different times, such as due to multi-path phenomena. It is therefore often desirable to estimate the channel response in order to establish high quality communications in the existing communication environment.

Multi-carrier communication systems, such as systems utilizing orthogonal frequency division multiplex (OFDM), which includes OFDM where the symbol is used by one user or multiple users (e.g., orthogonal frequency division multiple access (OFDMA)), often employ a pilot subcarrier to provide channel estimation with respect to data subcarriers used thereby. In OFDM and OFDMA systems, for example, where there are enough pilot subcarriers and the distribution of the pilot subcarriers is uniform and/or contiguous (consecutive), the channel response of the data subcarriers can be estimated relatively accurately from a measured pilot subcarrier channel response using the following relationship;

$$\hat{H}_t = AH_P \quad (1)$$

In the foregoing, $\hat{H}_t$ is the estimated channel response of subcarrier t, where t is an element of the set of all used subcarriers (T), $H_p$ is the channel response of all pilot subcarriers, where P is a subset of T, and A is a filter matrix providing channel estimation.

The number of pilot subcarriers needed in each symbol in order for the foregoing relationship to provide an accurate estimation of the data subcarriers channel response depends upon the channel characteristics. This relationship can be represented as follows:

$$\frac{1}{S_p} > \tau_{max}, \quad (2)$$

$S_p$ – Pilot subcarrier spacing $\tau_{max}$ – maximum delay of the channel

In the foregoing, $S_p$ is the pilot subcarrier spacing and $\tau_{max}$ is the maximum delay of the channel.

From the above, it can be appreciated that unavailability of an appropriate number of pilot subcarriers (e.g., often an appreciable amount of the available spectrum) and/or long channel delays (e.g., channel delays longer than a cyclic preamble (CP)) can present challenges in accurately estimating the data subcarrier channel. Further exacerbating the problem is the fact that the pilot subcarriers may not be consecutive or uniformly distributed, as presumed in the fundamental relationship of equation (1). Specifically, in various communication systems the available pilot subcarriers may not be continuously and uniformly distributed, thus rendering a data subcarrier channel estimation based upon a measured pilot subcarrier channel response using the relationship of equation (1) inaccurate.

For example, OFDMA systems operable under the IEEE 802.16e standard utilize subcarriers grouped into a tile arrangement. In such a tile arrangement the pilot subcarriers are typically not contiguous (non-consecutive) and not uniformly distributed (spacing between some pilot subcarriers and their nearest neighbor pilot subcarriers is not consistent). Moreover, a tile may be placed far away from other tiles and thus the channel response of data subcarriers in a tile should only be estimated using pilot subcarriers within that tile. Such a configuration results in very poor data subcarrier channel estimation using the measured pilot channel response and the relationship of equation (1).

BRIEF SUMMARY OF THE INVENTION

The present invention is directed to systems and methods which introduce a variable shift with respect to pilot symbols in providing a data subcarrier channel estimation. The foregoing shift is preferably a cyclical shift of samples associated with received symbols used in channel estimation, and may be introduced in the time or frequency domains according to embodiments of the invention. For example, a shift of a particular number of samples may be introduced with respect to the symbols of the pilot subcarriers in the measured pilot subcarrier channel response for use in data subcarrier channel estimation.

According to embodiments of the invention, a shift introduced with respect to pilot symbols for providing data subcarrier channel estimation is determined using the channel response of the pilot subcarriers. For example, the average delay of samples within a predetermined sample period, such as the first cyclic preamble length (e.g., the first samples of a frame), may be utilized as a cyclical shift factor according to an embodiment of the invention.

Embodiments of the invention filter the shift factor in order to avoid anomalous results associated with noise in the pilot subcarriers. For example, a shift factor of embodiments of the invention may be filtered among multiple symbols (e.g., the shift factor averaged for multiple symbols) before its use in data subcarrier channel estimation.

The foregoing shift factor facilitates accurate data subcarrier channel estimation, particularly in situations where the pilot subcarriers are non-consecutive, non-uniformly distributed, and/or where the channel response is long (e.g., approaching the length of the cyclic preamble (CP) due to a large multi-path delays). Such conditions are particularly likely to be associated with the use of OFDMA systems (often implement non-consecutive, non-uniformly distributed pilot subcarriers) and/or outdoor wireless systems (often involve long distance wireless communications with substantial multi-path delays).

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present inventions reference is now made to the following descriptions taken in conjunction with the accompanying drawing, in which.

DETAILED DESCRIPTION OF THE INVENTION

Figure 1:
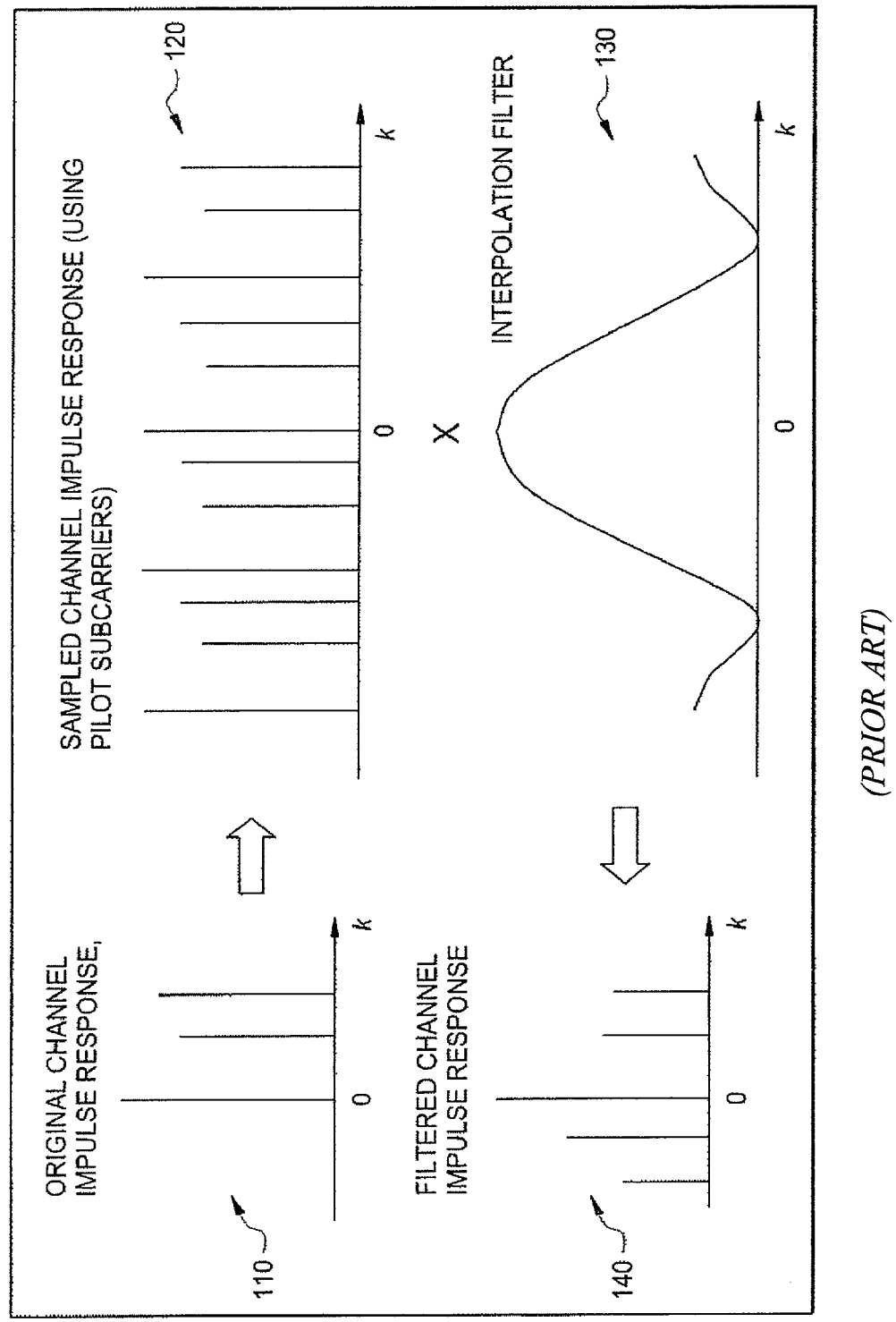
FIG. 1 illustrates the results of data subcarrier channel estimation in the time domain using a non-consecutive pilot subcarrier channel according to a traditional technique.

In order to better understand the present invention it is helpful to discuss the results of data subcarrier channel estimation in systems wherein the pilot subcarriers are non-consecutive and/or large multi-path delays are present. Directing attention to FIG. 1, data subcarrier channel estimation using the relationship of equation (1) is shown in the time domain. Specifically, graph 110 illustrates the channel impulse response and graph 120 illustrates the channel impulse response as sampled using non-consecutive, non-uniformly distributed pilot, subcarriers (e.g., the measured pilot subcarrier channel response in an OFDMA system). Graph 130 shows a time domain representation of the filter matrix (A) which, when applied to the sampled channel impulse response of graph 120, provides the filtered channel impulse response of graph 140. When graph 140 is compared to graph 110, it can readily be appreciated that data subcarrier estimation based upon this filtered channel impulse response does not accurately estimate the channel response (shown in graph 110).

Figure 2:
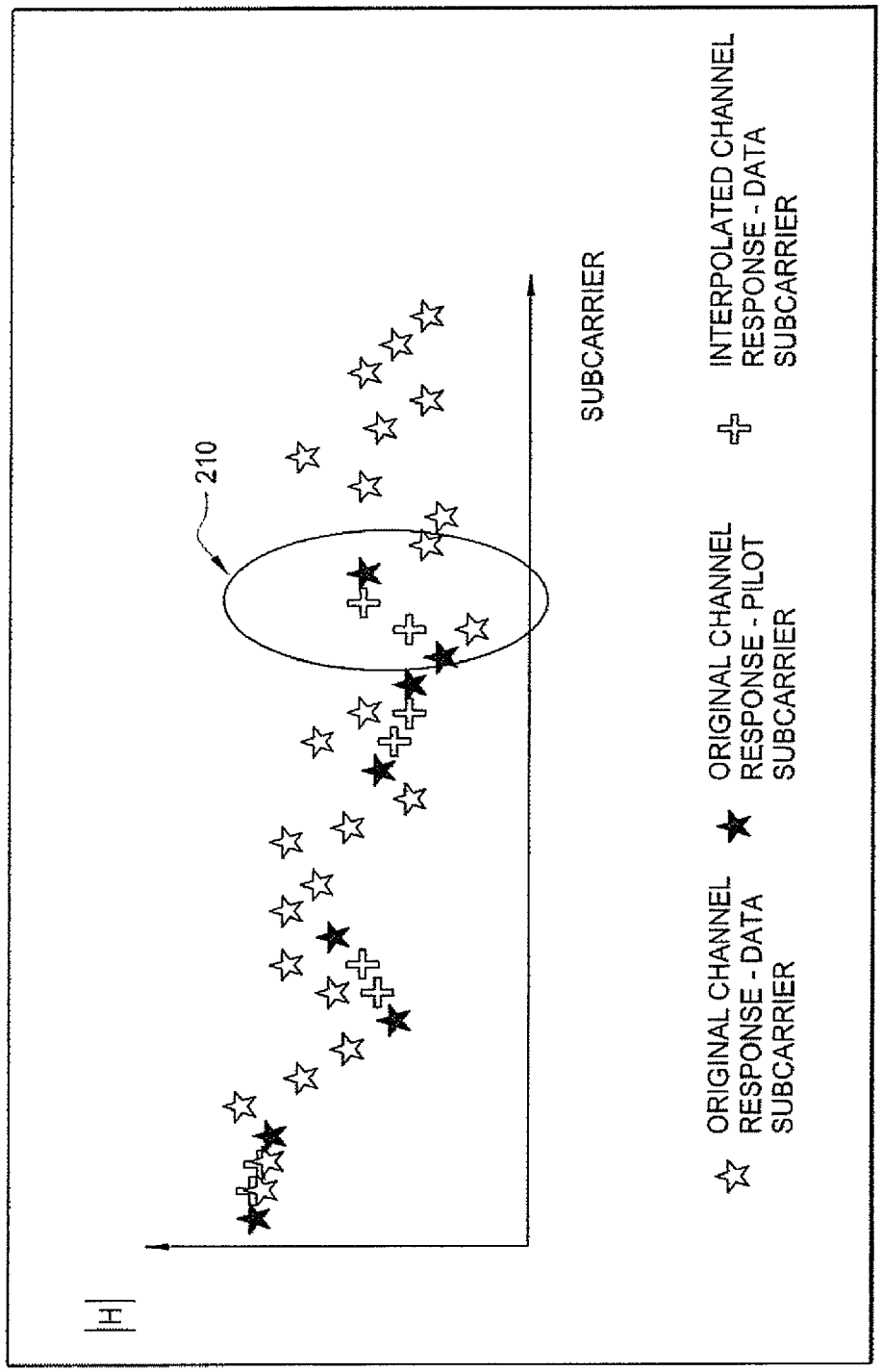
FIG. 2 illustrates the results of data subcarrier channel estimation in the frequency domain using a non-consecutive pilot subcarrier channel according to a traditional technique.

Data subcarrier channel estimation using the relationship of equation (1) is shown in the frequency domain in FIG. 2. In FIG. 2 it can again be seen that there is a large difference between the interpolated and the actual channel response, see e.g., area 210.

Figure 3A:
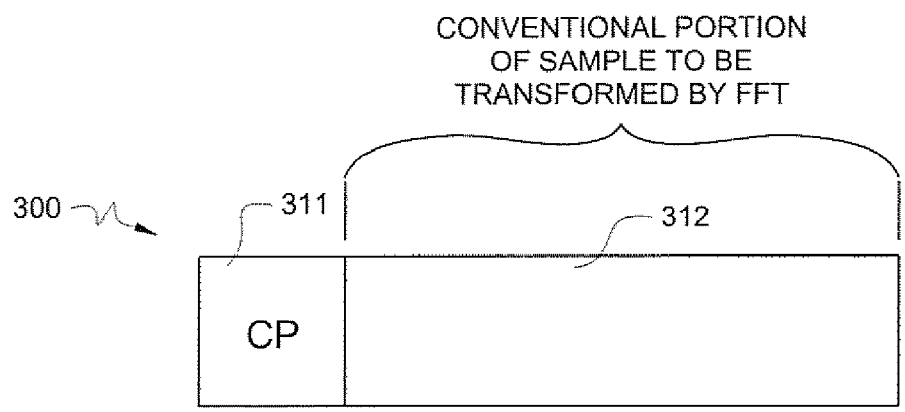
FIG. 3A shows an OFDM symbol in the time domain.
Figure 3B:
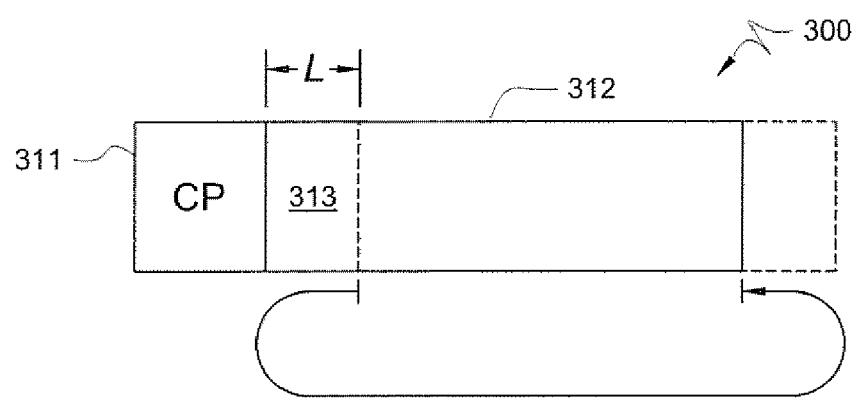
FIG. 3B shows a portion of the OFDM symbol of FIG. 3A identified for a cyclic shift according to an embodiment of the invention.
Figure 3C:
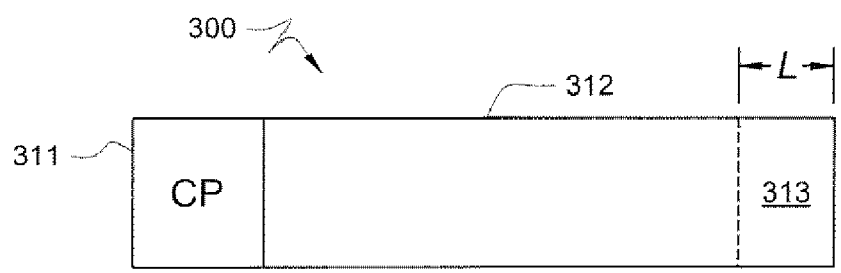
FIG. 3C shows the OFDM symbol of FIG. 3A having a cyclic shift of an embodiment of the present invention applied thereto.

Embodiments of the present invention introduce a variable shift with respect to pilot symbols in the measured pilot subcarrier channel response to provide a more accurate data subcarrier channel estimation. The foregoing shift is preferably a cyclical shift of a selected number (L) of samples within the payload portion of a frame. For example, a shift of L samples may be introduced in the time domain with respect to the symbols of the pilot subcarriers in the measured pilot subcarrier channel response as shown in FIGS. 3A-3C. Specifically, FIG. 3A shows a typical OFDM symbol (symbol 300) in time domain having cyclic preamble 311 and payload 312. FIG. 3B shows payload 312 having a shift factor L of samples identified for cyclic shifting according to an embodiment of the invention. Specifically, L samples at the front of payload 312 have been identified for cyclic shifting to the end of payload 312. FIG. 3C shows the OFDM symbol having a shift factor of L samples applied to cyclically shift L samples from the front of payload 312 to the end of payload 312. It should be appreciated that cyclic preamble 311 of that embodiment remains unchanged by the cyclic shift of this embodiment.

According to embodiments of the invention, the shift factor is determined using the measured channel response of the pilot subcarriers. For example, the average delay of samples within the pilot subcarriers may be utilized as a cyclical shift factor according to an embodiment of the invention.

The average delay of samples within the pilot subcarriers may be determined from the pilot channel impulse response. Accordingly, in determining a shift factor according to an embodiment of the invention, the measured pilot subcarrier channel response ($\hat{H}_P$) is transformed into an impulse response ($h_k$) using an inverse fast Fourier transform (IFFT). The average delay for the entire frame need not be calculated in order to provide a useful estimate of a shift factor (L). Thus the average delay of the samples for some subset of the frame, such as the length of the CP, is determined according to embodiments of the invention. The average delay of samples ($\bar{\tau}$) for the first CP length of the pilot channel impulse response ($h_k$) may be determined as follows:

$$\bar{\tau} = \frac{\sum_{k \in [0, CP]} |h_k|^2 \tau_k}{\sum_{k \in [0, CP]} |h_k|^2} \tag{3}$$

The average delay of samples ($\bar{\tau}$) for the first CP length of the pilot channel impulse response ($h_k$) may be used as a shift factor (L) according to embodiments of the invention. That is L=($\bar{\tau}$) according to embodiments of the invention.

In order to accurately determine and/or apply the shift factor of embodiments of the invention, symbol timing is preferably accurately and reliably aligned with the first arriving path of a channel with multiple paths. A preferred technique for providing timing synchronization which accurately and reliably utilize the first arriving path of a multi-path channel is shown and described in the above referenced patent application entitled "OFDM/OFDMA TIMING SYNCHRONIZATION USING NON-CONSECUTIVE PILOT SUBCARRIER ASSIGNMENT." Such timing synchronization is desirable in order to avoid inter symbol interference from the next symbol as well as to capture all the energy of a given symbol from all the multi-paths.

Embodiments of the invention filter the shift factor in order to avoid anomalous results associated with noise in the pilot subcarriers. For example, a shift factor (L) of embodiments of the invention may be filtered among multiple symbols (e.g., the shift factor averaged for multiple symbols) to provide a filtered shift factor ($\underline{L}$).

Using the foregoing shift factor is preferably introduced with respect to the symbols of the pilot subcarriers in the measured pilot subcarrier channel response to provide an accurate data subcarrier channel estimation. For example, embodiments of the invention determine a data subcarrier channel estimation ($\hat{H}_t$) using the shift factor (L) and the measured pilot subcarrier channel response ($\hat{H}_P$) as set forth below:

$$\hat{H}_t e^{j2\pi \frac{Li}{N}} = A\hat{H}_p e^{j2\pi \frac{LP}{N}} \quad (4)$$

From the above, it should be appreciated that the shift is effective to shift the original causal channel impulse response (depends upon current or instantaneous response) to a non-causal channel impulse response (depends upon further as well as current responses) which better matches the filter (A) which is used in data subcarrier channel estimation.

Figure 4:
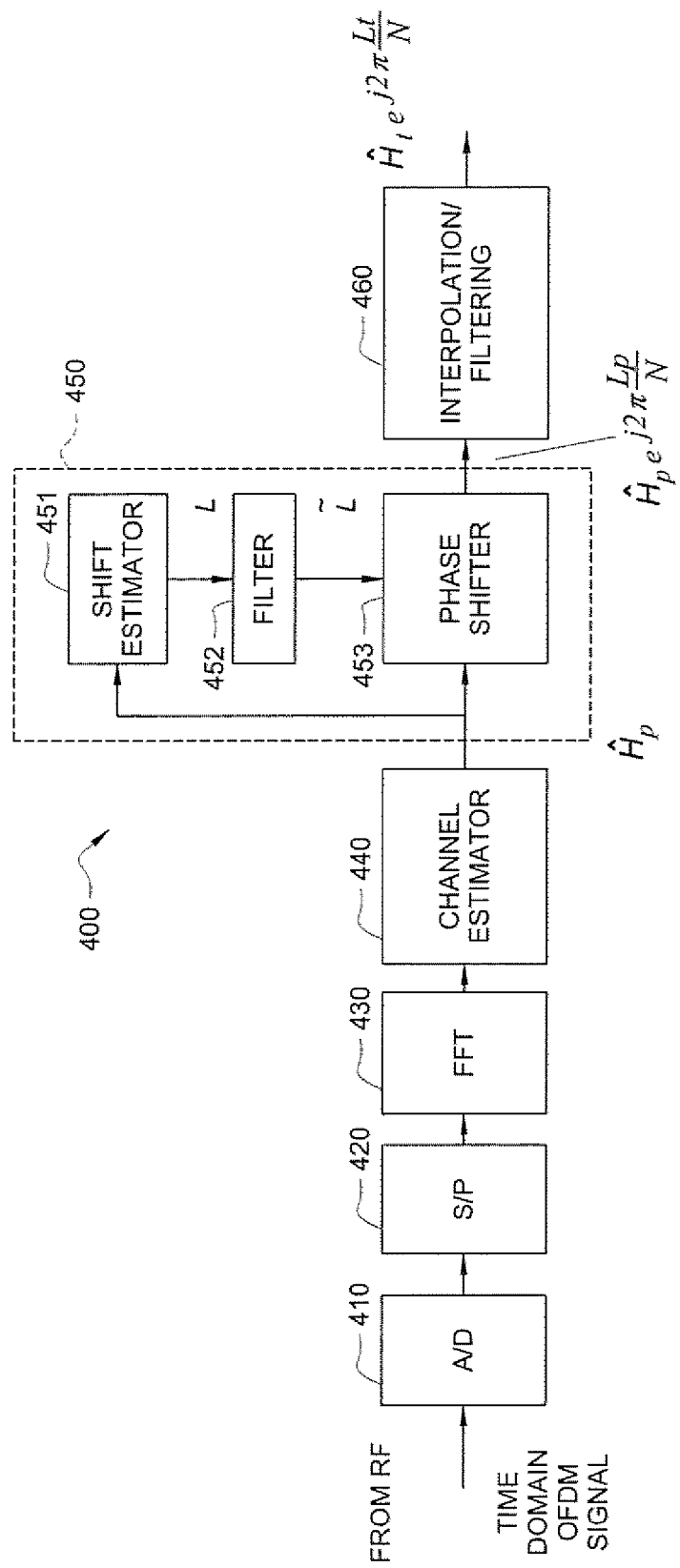
FIG. 4 shows a high level block diagram of a system for determining a shift factor and applying the shift factor in the frequency domain for data subcarrier channel estimation according to an embodiment of the invention.

Embodiments of the present invention may introduce the foregoing shift factor in the time domain or the frequency domain. Directing attention to FIG. 14, a functional block diagram of a system adapted according to an embodiment to provide data subcarrier channel estimation using a shift in the frequency domain is shown. System 400 of FIG. 4 may, for example, be implemented in a processor-based system of an OFDMA base station and/or OFDMA subscriber station according to embodiments of the invention. Such systems may comprise, for example, a general purpose computer system operable under control of an instruction set defining operation as described herein or a special purpose processor configured to provide operation as described herein. Additionally or alternatively, embodiments of the invention may utilize circuitry configured to provide operation as described herein, such as in the form of application specific integrated circuits (ASICs). Moreover, embodiments of the invention may utilize combinations of the foregoing, if desired.

System 400 of the illustrated embodiment includes analog to digital (A/D) converter 410 operable to convert a received analog pilot signal to a digital data stream for further processing. Signal processor 420 provides pilot symbol detection and/or other signal processing (e.g. timing synchronization) as may be desired with respect to the pilot signal. Fast Fourier transform (FFT) 440 transforms the pilot signal from the time domain to the frequency domain. Channel estimator 440 provides a measured pilot subcarrier channel response (Hp) from the frequency domain output of FFT 430. Block 450 provides shift factor estimation and applies the shift factor in the form of a phase shift.

Specifically, shift estimator 451 of the illustrated embodiment determines a desired shift factor (L) from the measured pilot subcarrier channel response ($\hat{H}_P$), such as by using an average of the sample delays as described above. The shift factor (L) of the illustrated embodiment is filtered by filter 452, such as through averaging the shift factor for multiple symbols, to provide a filtered shift factor ($\underline{L}$) which is less affected by noise in the pilot channel. The filtered shift factor ($\underline{L}$) is provided to phase shifter 453 to thereby introduce an amount of phase shift corresponding to the shift factor (L) into measured pilot subcarrier channel response ($\hat{H}_P$).

The phase shifted pilot subcarrier channel response ($\hat{H}_P$) of the illustrated embodiment is provided to filter 460 (corresponding to filter A in the above equations) to provide a data subcarrier channel estimate. Filter 460 of embodiments may comprise any form of channel estimation technique, such as various types of interpolation, Wiener (MMSE channel estimation), or other filters.

Figure 5:
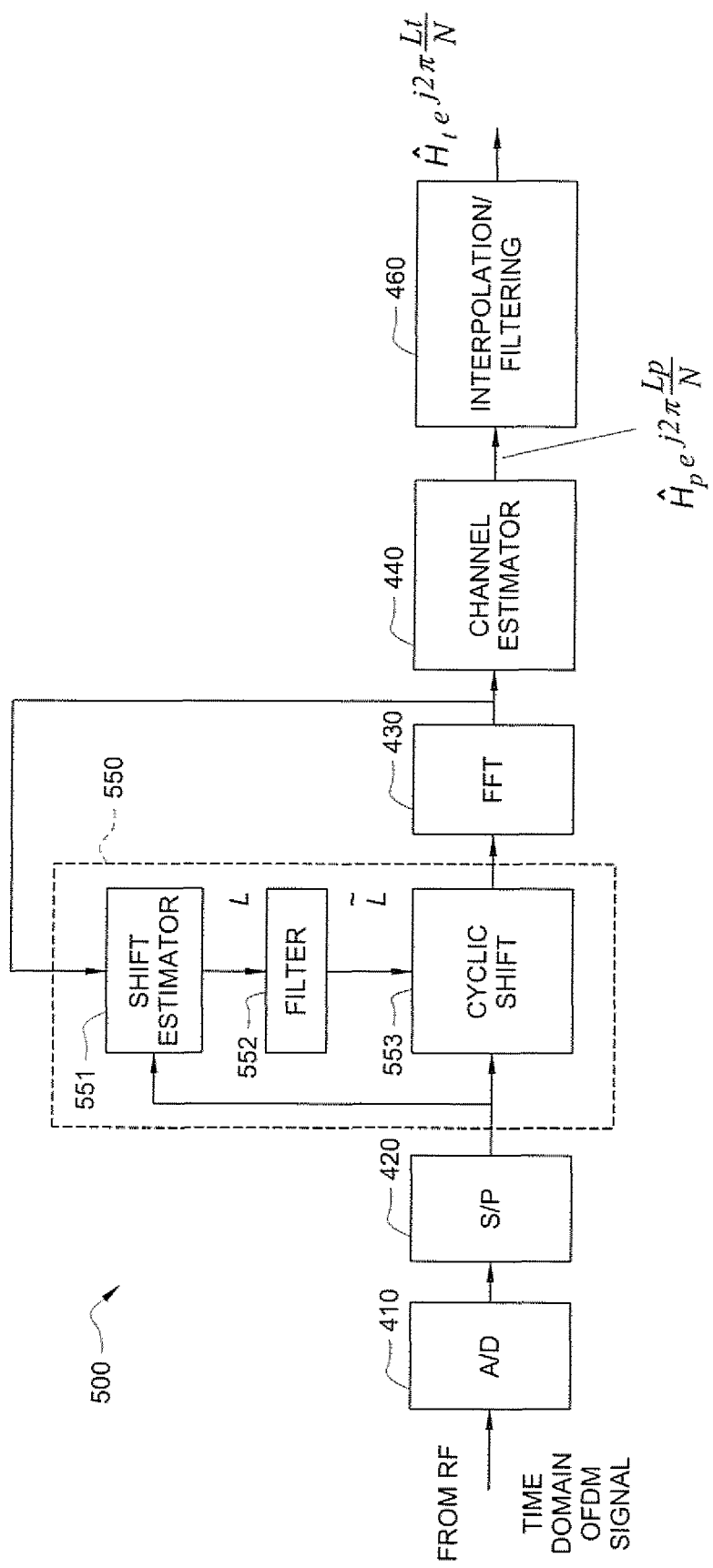
FIG. 5 shows a high level block diagram of a system for determining a shift factor and applying the shift factor in the time domain for data subcarrier channel estimation according to an embodiment of the invention.

Directing attention to FIG. 5, a functional block diagram of a system adapted according to an alternative embodiment to provide data subcarrier channel estimation using a shift introduced in the time domain is shown. System 500 of FIG. 5 may, for example, be implemented in a processor-based system of an OFDMA base station and/or OFDMA subscriber station according to embodiments of the invention. Such systems may comprise, for example, a general purpose computer system operable under control of an instruction set defining operation as described herein or a special purpose processor configured to provide operation as described herein. Additionally or alternatively, embodiments of the invention nay utilize circuitry configured to provide operation as described herein, such as in the form of application specific integrated circuits (ASICs). Moreover, embodiments of the invention may utilize combinations of the foregoing, if desired.

Similar to system 400 described above, system 500 of the illustrated embodiment includes AD converter 410, signal processor 420, FFT 430, channel estimator 440, and filter 460. However, as the shift is introduced in the time domain in the embodiment of FIG. 5, block 550 providing introduction of the time domain shift is disposed in the signal path prior to FFT 430 which transforms the pilot signal from the time domain to the frequency domain.

In the embodiment illustrated in FIG. 5. A/D converter 410 converts a received analog pilot signal to a digital data stream for further processing. Signal processor 420 provides pilot symbol detection and/or other signal processing (e.g., timing synchronization) as may be desired with respect to the pilot signal. Block 550 provides shift factor estimation and applies the shift factor in the form of a cyclic time shift.

Specifically, shift estimator 551 of the illustrated embodiment determines a desired shift factor (L) from the measured pilot subcarrier channel response ($\hat{H}_P$) such as by using an average of the sample delays as described above. The shift factor (L) of the illustrated embodiment is filtered by filter 552, such as through averaging the shift factor for multiple symbols, to provide a filtered shift factor ($\underline{L}$) which is less affected by noise in the pilot channel. The filtered shift factor ($\underline{L}$) is provided to cyclic shifter 553 to thereby introduce an amount of cyclic shift corresponding to the shift factor ($\underline{L}$) into the received pilot signal. The filtered shift factor ($\underline{L}$) initially provided to cyclic shifter 553 may be some default value, wherein subsequent symbols are cyclic shifted according to the filtered shift factor ($\underline{L}$) derived from previous symbols.

Fast Fourier transform (FFT) 430 transforms the time shifted pilot signal from the time domain to the frequency domain. Channel estimator 440 provides a time shifted pilot subcarrier channel response ($\hat{H}_P$) from the frequency domain output of FFT 440. The time shifted pilot subcarrier channel response ($\hat{H}_P$) of the illustrated embodiment is provided to filter 460 (corresponding to filter A in the above equations) to provide a data subcarrier channel estimate.

Figure 6:
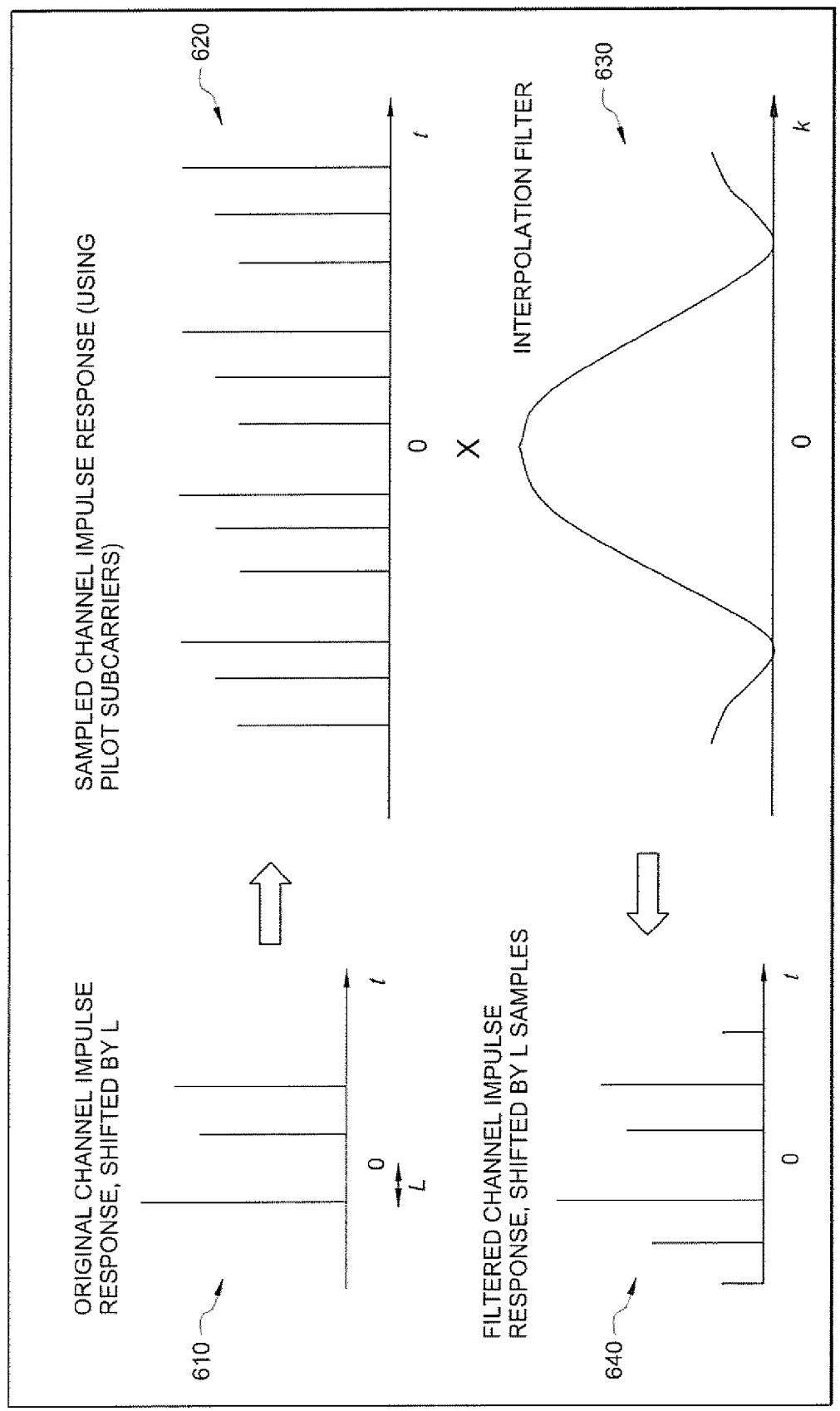
FIG. 6 illustrates the results of data subcarrier channel estimation in the time domain using a non-consecutive pilot subcarrier channel according to embodiments of the present invention.

The foregoing shift factor facilitates accurate data subcarrier channel estimation, particularly in situations where the pilot subcarriers are non-consecutive and/or where the channel response is long (e.g., approaching the length of the cyclic preamble (CP) due to a large multi-path delays). Directing attention to FIG. 6, data subcarrier channel estimation using a shift factor as described herein (as represented in the relationship of equation (4)) is shown in the time domain. Specifically, graph 610 illustrates the channel impulse response and graph 620 illustrates the channel impulse response as sampled using non-consecutive, non-uniformly distributed pilot subcarriers (e.g., the measured pilot subcarrier channel response in an OFDMA system). Graph 630 shows a time domain representation of the filter matrix (A) which, when applied to the sampled channel impulse response of graph 620, provides the filtered channel impulse response of graph 640. When graph 640 is compared to graph 610, it can readily be appreciated that data subcarrier estimation based upon this filtered channel impulse response more accurately estimates the channel response (shown in graph 610) than does data subcarrier estimation graph 140 of FIG. 1.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method comprising:
   determining a shift factor from a pilot subcarrier channel response associated with a received pilot signal using a shift factor estimator; and
   estimating a data subcarrier channel as a function of said shift factor and said received pilot signal
   wherein said determining said shift factor comprises:
   determining an average sample delay associated with a portion of said pilot signal.

2. The method of claim 1, wherein said portion of said pilot signal comprises a cyclic preamble.

3. A method comprising:
   determining a shift factor from a pilot subcarrier channel response associated with a received pilot signal; and
   estimating a data subcarrier channel as a function of said shift factor and said received pilot signal,
   wherein said determining said shift factor comprises:
   determining a plurality of shift factors, wherein said plurality of shift factors are associated with different symbols of a plurality of symbols in said pilot signal; and
   filtering said plurality of shift factors to provide said shift factor.

4. The method of claim 3, wherein said filtering comprises: averaging said plurality of putative shift factors.

5. A method comprising:
   determining a shift factor from a pilot subcarrier channel response associated with a received pilot signal using a shift factor estimator; and
   estimating a data subcarrier channel as a function of said shift factor and said received pilot signal,
   wherein said estimating said data subcarrier channel comprises:
   applying a cyclic shift of samples of symbols of a payload portion of a frame of said pilot signal without altering a cyclic prefix portion of said frame of said pilot signal.

6. A method comprising:
   determining a shift factor from a pilot subcarrier channel response associated with a received pilot signal using a shift factor estimator; and
   estimating a data subcarrier channel as a function of said shift factor and said received pilot signal,
   wherein said estimating said data subcarrier channel comprises:
   applying a cyclic shift of samples of symbols of said pilot signal, wherein said cyclic shift corresponds to said shift factor;
   determining a pilot subcarrier channel response from said shifted pilot signal symbols; and
   filtering said pilot subcarrier channel response to provide said data subcarrier channel estimation.

7. A method comprising:
   determining a shift factor from a pilot subcarrier channel response associated with a received pilot signal using a shift factor estimator; and
   estimating a data subcarrier channel as a function of said shift factor and said received pilot signal,
   wherein said estimating said data subcarrier channel comprises:
   determining a pilot subcarrier channel response from said pilot signal;
   applying a phase shift to said pilot subcarrier channel response, wherein said phase shift corresponds to said shift factor; and
   filtering said shifted pilot subcarrier channel response to provide said data subcarrier channel estimation.

8. A system for providing a data subcarrier channel estimate, said system comprising:
   a pilot subcarrier channel response estimator operable to provide a pilot subcarrier channel response from a pilot signal provided thereto;
   a shift factor estimator coupled to said pilot subcarrier channel response estimator and operable to compute a shift factor as a function of said pilot subcarrier channel response;
   a cyclic shifter coupled to said shift factor estimator and operable to introduce a cyclic shift of pilot signal samples, wherein an amount of said cyclic shift corresponds to said shift factor; and
   a filter coupled to said pilot subcarrier channel response estimator and operable to provide a data subcarrier channel estimate from said pilot subcarrier channel response.

9. The system of claim 8, wherein said pilot signal is transmitted using a non-consecutive pilot subcarrier assignment.

10. The system of claim 8, wherein said shift factor estimator comprises logic to determine an average sample delay with respect to a portion of a pilot signal symbol.

11. The system of claim 10, wherein said portion of said pilot signal symbol comprises a cyclic preamble.

12. The system of claim 8, further comprising:
a shift factor filter coupled to said shift factor estimator and operable to provide a filtered shift factor to said cyclic shifter for introducing a cyclic shift corresponding to said filtered shift factor.

13. The system of claim 11, wherein said shift factor filter provides averaging with respect to a plurality of shift factors, wherein said plurality of shift factors are determined from a plurality of symbols of said pilot signal.

14. A system for providing a data subcarrier channel estimate, said system comprising:
a pilot subcarrier channel response estimator operable to provide a pilot subcarrier channel response from a pilot signal provided thereto;
a shift factor estimator coupled to said pilot subcarrier channel response estimator and operable to compute a shift factor as a function of said pilot subcarrier channel response;
a phase shifter coupled to said shift factor estimator and operable to introduce a phase shift to said pilot subcarrier channel response, wherein an amount of said phase shift corresponds to said shift factor; and
a filter coupled to said phase shifter and operable to provide a data subcarrier channel estimate from said phase shifted pilot subcarrier channel response.

15. The system of claim 14, wherein said pilot signal is transmitted using a non-consecutive pilot subcarrier assignment.

16. The system of claim 14, wherein said shift factor estimator comprises logic to determine an average sample delay with respect to a portion of a pilot signal symbol.

17. The system of claim 16, wherein said portion of said pilot signal symbol comprises a cyclic preamble.

18. The system of claim 14, further comprising:
a shift factor filter coupled to said shift factor estimator and operable to provide a filtered shift factor to said cyclic shifter for introducing a cyclic shift corresponding to said filtered shift factor.

19. The system of claim 18, wherein said shift factor filter provides averaging with respect to a plurality of shift factors, wherein said plurality of shift factors are determined from a plurality of symbols of said pilot signal.

* * * * *

UNITED STATES PATENT AND TRADEMARK OFFICE
CERTIFICATE OF CORRECTION

PATENT NO. : 7,830,984 B2
APPLICATION NO. : 11/694616
DATED : November 9, 2010
INVENTOR(S) : Cheong Yui Wong It is certified that error appears in the above-identified patent and that said Letters Patent is hereby corrected as shown below:

Column 2, Line 8, delete the portion of text reading "continuously" and replace with --contiguously--.

Column 2, Line 43, delete the portion of text reading "first samples" and replace with --first 512 samples--.

Column 5, Line 4, Equation (4), delete both portions of the equation reading " $\frac{Li}{N}$ " and " $\frac{LP}{N}$ " and replace with -- $\frac{Li}{N}$ -- and -- $\frac{Lp}{N}$ -- respectively.

Column 5, Line 12, delete the portion of text reading "filtered shift factor $(L)$" and replace with --filtered shift factor $(\tilde{L})$--.

Column 5, Line 60, delete the portion of text reading "(Hp)" and replace with -- $(\tilde{H}_p)$ --.

Column 6, Line 3, delete the portion of text reading "filtered shift factor $(L)$" and replace with --filtered shift factor $(\tilde{L})$--.

Column 6, Line 6, delete the portion of text reading " $(L)$ " and replace with -- $(\tilde{L})$ --.

Column 6, Line 29, delete the portion of text reading "nay" and replace with --may--.

Column 6, Line 55, delete the portion of text reading "filtered shift factor $(L)$" and replace with --filtered shift factor $(\tilde{L})$--.

Column 6, Line 58, delete the portion of text reading " $(L)$ " and replace with -- $(\tilde{L})$ --.

Signed and Sealed this
Twenty-ninth Day of May, 2012

David J. Kappos
*Director of the United States Patent and Trademark Office*

CERTIFICATE OF CORRECTION (continued)

Column 6, Line 60, delete the portion of text reading "shift factor $(\check{L})$" and replace with --shift factor (L)--.

Column 6, Line 62, delete the portion of text reading "filtered shift factor $(\check{L})$" and replace with --filtered shift factor $(\tilde{L})$--.

Column 6, Line 65, delete the portion of text reading "filtered shift factor $(\check{L})$" and replace with --filtered shift factor $(\tilde{L})$--.

In the Claims:

Column 8, Claim 4, Line 7, delete the portion of text reading "putative".